United States Patent
Talmor et al.

(10) Patent No.: US 12,530,190 B2
(45) Date of Patent: *Jan. 20, 2026

(54) CONFIGURATION MANAGEMENT PROJECT STRUCTURE ADAPTATION

(71) Applicant: Red Hat, Inc., Raleigh, NC (US)

(72) Inventors: Avraham Talmor, Rishon Letzion (IL); Arie Bregman, Gan Yavne (IL)

(73) Assignee: Red Hat, Inc., Raleigh, NC (US)

( * ) Notice: Subject to any disclaimer, the term of this patent is extended or adjusted under 35 U.S.C. 154(b) by 267 days.

This patent is subject to a terminal disclaimer.

(21) Appl. No.: 18/138,214

(22) Filed: Apr. 24, 2023

(65) Prior Publication Data

US 2024/0354100 A1    Oct. 24, 2024

(51) Int. Cl.
*G06F 8/71* (2018.01)
*G06F 8/41* (2018.01)

(52) U.S. Cl.
CPC ............... *G06F 8/71* (2013.01); *G06F 8/456* (2013.01)

(58) Field of Classification Search
None
See application file for complete search history.

(56) References Cited

U.S. PATENT DOCUMENTS

| | | | | |
|---|---|---|---|---|
| 7,984,426 B2* | 7/2011 | Loff | ............................ | G06F 8/71 717/121 |
| 8,473,893 B2* | 6/2013 | Poole | ........................ | G06F 8/75 717/103 |
| 10,318,284 B2* | 6/2019 | Onorato | ...................... | G06F 8/71 |
| 11,074,239 B2* | 7/2021 | Polinati | ............... | G06F 16/2365 |
| 2003/0056193 A1* | 3/2003 | Perycz | ........................ | G06F 8/71 717/107 |
| 2021/0318950 A1* | 10/2021 | Chen | .................... | G06F 11/3696 |
| 2024/0354100 A1* | 10/2024 | Talmor | ...................... | G06F 8/71 |

FOREIGN PATENT DOCUMENTS

| | | |
|---|---|---|
| CN | 110619505 A | 12/2019 |
| CN | 113205304 A | 8/2021 |
| CN | 113703721 A | 11/2021 |

OTHER PUBLICATIONS

Oumaziz, "Handling duplicates in Dockerfiles families: Learning from experts", 2019, IEEE (Year: 2019).*

"Configuration and system management | XOAP", accessed at: https://xoap.io/configXO.html on Dec. 27, 2022, 10 pages.

* cited by examiner

*Primary Examiner* — Hossain M Morshed

(74) *Attorney, Agent, or Firm* — Kilpatrick Townsend & Stockton LLP

(57) ABSTRACT

The present disclosure provides new and innovative systems and methods for automatically modifying configuration management projects. In an example, a computer-implemented method includes analyzing code from a configuration management project, identifying parallel and duplicate structures in the code, and modifying the code to condense the parallel and duplicate structures into a plurality of roles that can be referenced by a playbook.

20 Claims, 6 Drawing Sheets

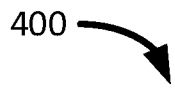

```
400
```

Receive a request for optimization of a configuration management project
402

Analyze playbooks and identify similar and identical tasks within multiple playbooks
404

Consolidate identical sections into at least one role
406

Replace identical tasks within playbooks with references to the appropriate created role
408

Prompt user with options for condensing similar tasks
410

Consolidate similar tasks into at least one role responsive to user input
412

Replace similar tasks within playbooks with references to the appropriate created role
414

Fig. 4

CONFIGURATION MANAGEMENT PROJECT STRUCTURE ADAPTATION

BACKGROUND

Configuration management is a process by which systems such as computer software and hardware can be maintained in a desired state during development and deployment. The goal of a configuration management project is to ensure system performance that is consistent with design parameters over a lifespan that may involve multiple versions or updates. Configuration management projects are often implemented with tools such as the Red Hat Ansible Automation Platform in order to better handle large volumes of data that are often involved in such projects.

SUMMARY

The present disclosure provides new and innovative methods for automatically adjusting the structure of a configuration management project. In an example, a computer-implemented method includes analyzing code from a configuration management project, identifying parallel and duplicate structures in the code, and modifying the code to condense the parallel and duplicate structures into a plurality of roles that can be referenced in a playbook.

In an example, an apparatus includes a memory and a processing device, operatively coupled to the memory, to analyze code from a configuration management project, identify parallel and duplicate structures in the code, and modify the code to condense the parallel and duplicate structures into a plurality of roles that can be referenced by a playbook.

In an example, an apparatus includes a non-transitory computer-readable storage medium storing instructions which, when executed by a processing device, cause the device to analyze code from a configuration management project, identify parallel and duplicate structures in the code, and modify the code to condense parallel and duplicate structures into a plurality of roles that can be referenced by a playbook.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the Figures and the Detailed Description. Moreover, it should be noted that the language used in this specification has been principally selected for readability and instructional purposes, and not to limit the scope of the inventive subject matter.

BRIEF DESCRIPTION OF THE FIGURES

The description will be more fully understood with reference to the following figures, which are presented as exemplary aspects of the disclosure and should not be construed as a complete recitation of the scope of the disclosure, wherein:

FIG. 4 illustrates a flow chart of an example method for consolidating both similar and identical tasks within a configuration management project, according to an example embodiment of the present disclosure.

DETAILED DESCRIPTION

Techniques are disclosed herein for automatically modifying the structure of a configuration management project. Configuration management projects typically consist of a variety of playbooks which in turn consist of a variety of tasks. These tasks can be encapsulated within roles, which can be referenced by a playbook in place of explicitly defining a task each time it appears within the project.

Condensing tasks into roles within a large configuration management (CM) project can be time-consuming and introduce many opportunities for human error. Existing systems require a user to manually search through a CM project for duplicative structures, determine how to best condense these structures into a role, implement the role, and then individually replace each instance of the structure in the project with a reference to the new role. It is therefore desirable to automate these processes as much as possible in order to speed up development timelines, reduce volumes of monotonous modification work, and increase reliability of the CM project.

Systems and methods in accordance with aspects of the present disclosure can automatically analyze code from a CM project, identify parallel and duplicate structures in the code, and modify the code to condense parallel and duplicate structures into a plurality of roles that can be referenced by a playbook. Automation of these processes can allow for significant improvements to be realized in the time expenditure required to modify a CM project. Additionally, the ability to query a user with decisions too complex to be made automatically allows for abstraction of the processes in a way that minimizes opportunities for human error in performing repetitive or monotonous tasks.

Figure 1:
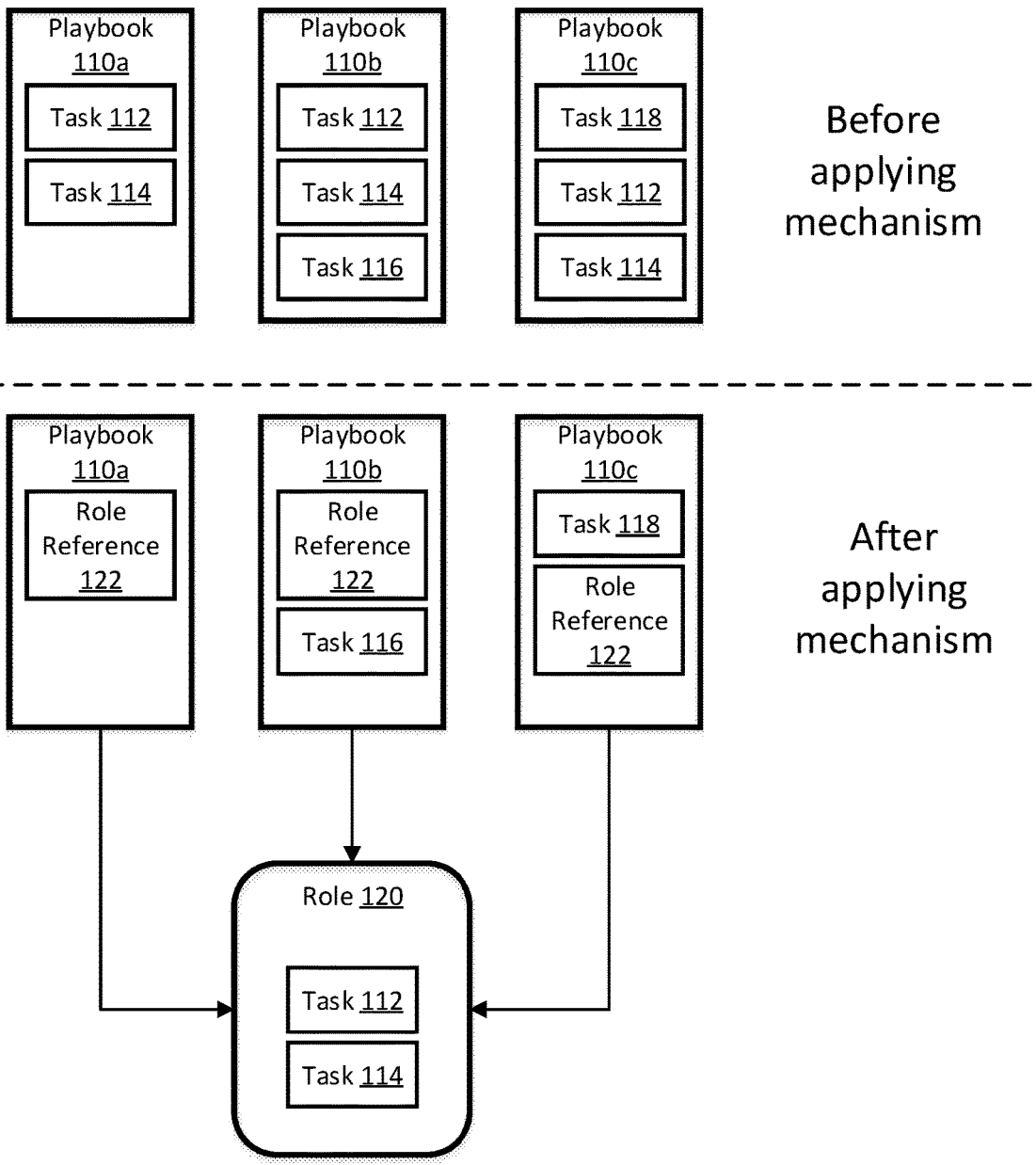
FIG. 1 illustrates a structural diagram of an example configuration management project before and after modification, according to an example embodiment of the present disclosure.

FIG. 1 illustrates a structural diagram of an example configuration management (CM) project 100 before and after modification, according to an example embodiment of the present disclosure. An example CM project 100 includes playbooks 110a-c, which in turn include task 112, task 114, task 116, and task 118 (collectively, tasks 112-118). The upper portion of FIG. 1 depicts the CM project 100 before a system or method in accordance with aspects of the present disclosure is applied. In this scenario, playbook 110a consists of task 112 followed by task 114, playbook 110b consists of task 112 followed by task 114 and then task 116, and playbook 110c consists of task 118 followed by task 112 and then task 114. It can clearly be seen that each of the playbooks 110a-c contains task 112 followed by task 114, so a sequence of task 112 followed by task 114 can be condensed into a role 120. The role 120 can then replace the sequence of task 112 followed by task 114 as a role reference 122 within the playbooks 110a-c. The aforementioned alterations to the CM project 100 result in a structure depicted in the lower portion of FIG. 1, which is the arrangement of the CM project 100 after the system or method in accordance with aspects of the present disclosure is applied.

In other examples of the present disclosure, the CM project 100 may consist of additional playbooks 110a-c which may in turn consist of additional tasks 112-118. In some examples of the present disclosure the CM project 100 initially possesses a structure that allows the tasks 112-118 to be condensed into additional roles 120 with additional corresponding references 122. It should also be appreciated that the role 120 may consist of any number of the tasks 112-118 in any order, so long as a corresponding sequence of the tasks 112-118 exists in at least two of the playbooks 110a-c within the initial structure of the CM project 100. In some examples the role 120 may include a reference 122 to another role 120.

Figure 2:
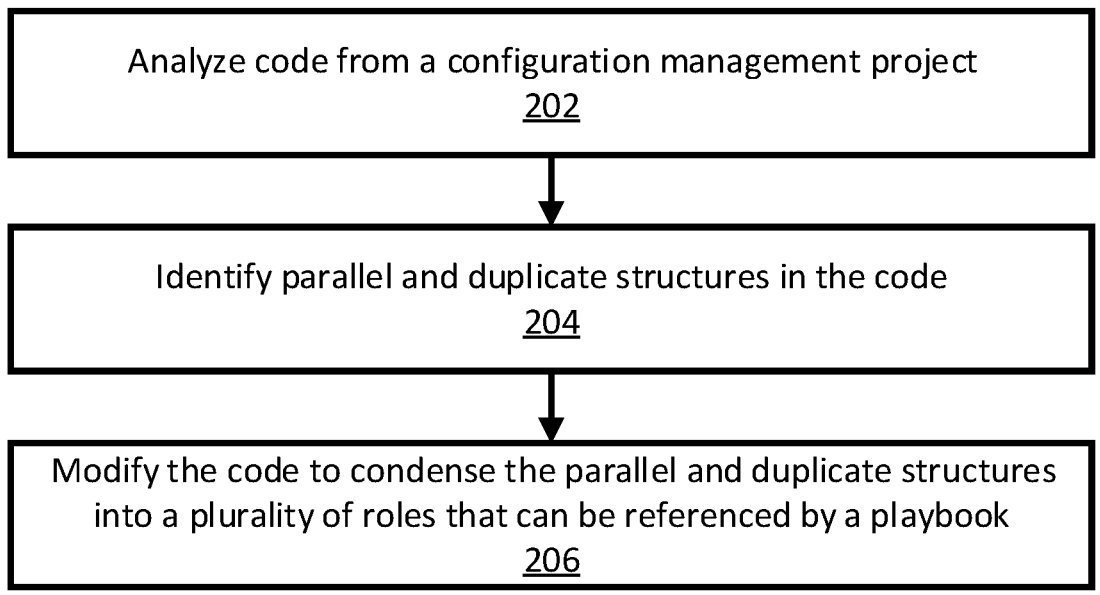
FIG. 2 illustrates a flow chart of an example method for modifying configuration management projects, according to an example embodiment of the present disclosure.

FIG. 2 illustrates a flow chart of an example method 200 for modifying configuration management (CM) projects, according to an example embodiment of the present disclosure. It should be appreciated that the example method 200 is presented with a high level of abstraction, and that the blocks of the flow chart depicted in FIG. 2 may consist of a number of activities, some of which may not be described herein.

At block 202, a system analyzes code from a CM project to identify parallel and duplicate structures in the code. The system may employ any of a number of techniques to analyze the code including comparing text from a plurality of sections of source code, structural analysis, data flow analysis, machine learning, hashing sections of code to compare hashed values, and combinations thereof. The system may also employ predetermined rulesets to automatically identify structures that are commonly found and thus likely to be paralleled or duplicated elsewhere and to compare instances of these structures to determine which of them can be condensed.

The system may prompt a user to approve recommended changes to the code. For example, upon identifying two similar instances of a code structure, the system may present a summary of the similarities and differences of the instances to the user. The summary may include information such as a list of variables used by the instances, locations of the instances within the project structure, source code, and metadata associated with the source code. The summary may also include two or more proposed modification strategies for the user to select from. For example, the system may identify a structure as a good candidate for consolidation and prompt the user to confirm or select from a recommended change or set of changes. The prompt may include a mechanism whereby the user can individually manage, alter, or replace a modification of a version of a role. For example, the prompt may include an interface that allows the user to modify a section of source code for which the system has proposed alterations.

At block 204, the system identifies parallel and duplicate structures in the code. A parallel structure is defined as at least two sections of code that share enough similarities that they are interchangeable with minor alterations. For example, a parallel structure exists where two sections of code can be interchanged by employing an additional variable and a forked section of code. A duplicate structure is defined as at least two sections of code that are interchangeable without significant alteration. For example, a duplicate structure exists where merely superficial elements such as variable names need be altered in order to render the sections interchangeable.

The system may detect identical sections of a plurality of sections of code and flag them for consolidation. The system may also detect sections of the plurality of sections of code that exceed a predefined threshold of similarity. This threshold can be defined based upon any metric or combination of metrics related to the code or project structure. For example, the threshold can be defined as two sections of code possessing a certain percentage of identical text, a certain set of structural patterns, substantially similar functionality, or any combination thereof. It should be appreciated that many other metrics may be included beyond what is disclosed herein, and that examples which employ machine learning especially may employ metrics that are unknown to even the creators of a system.

At block 206, the system modifies the code to condense the parallel and duplicate structures identified in block 204 into a plurality of roles that can be referenced by playbooks. When the system identifies a plurality of identical sections of code within a CM project, the system may condense the plurality of identical sections of code into a single role which is configured to be called in place of the plurality of existing sections. Upon prompting for and receiving user input, the system may condense merely a portion of the plurality of identical sections into the single role, leaving the remainder of the plurality of identical sections explicitly defined within their respective playbooks. The system may also employ a predetermined ruleset to automatically determine that a scenario exists where it is desirable to condense merely a portion of the plurality of identical sections into a role, thereby bypassing the need for the system to prompt the user with regard to such scenarios.

When the system identifies parallel sections of code that are above a predetermined threshold of similarity (see block 204 above), the system may combine the parallel sections of code into a single role (see FIG. 1). This process may involve prompting the user to make determinations regarding particular alterations to the parallel sections that are required to render the parallel sections interchangeable. This process may also involve automatically determining the differences between individual sections of the plurality of sections and creating a role that iterates through a plurality of versions that correspond to the plurality of sections. For example, two similar sections of code may be structured such that a replacement role may be implemented in which a process iterates multiple times with each iteration comprising a version of the role that corresponds to a section of the plurality of sections. The role may alter variable values between iterations and may also employ forked structures so that sections of code that differ between iterations can be selected as needed.

The system may condense merely a subgrouping of the parallel sections. For example, the system may identify a plurality of differing versions of the parallel sections and determine that the best course of action for condensing is to exclude one or more versions from a created role. A version of a parallel section may be excluded on the basis of user input subsequent to prompting the user, or on the basis of a predefined ruleset that can be referenced by the system.

Figure 3:
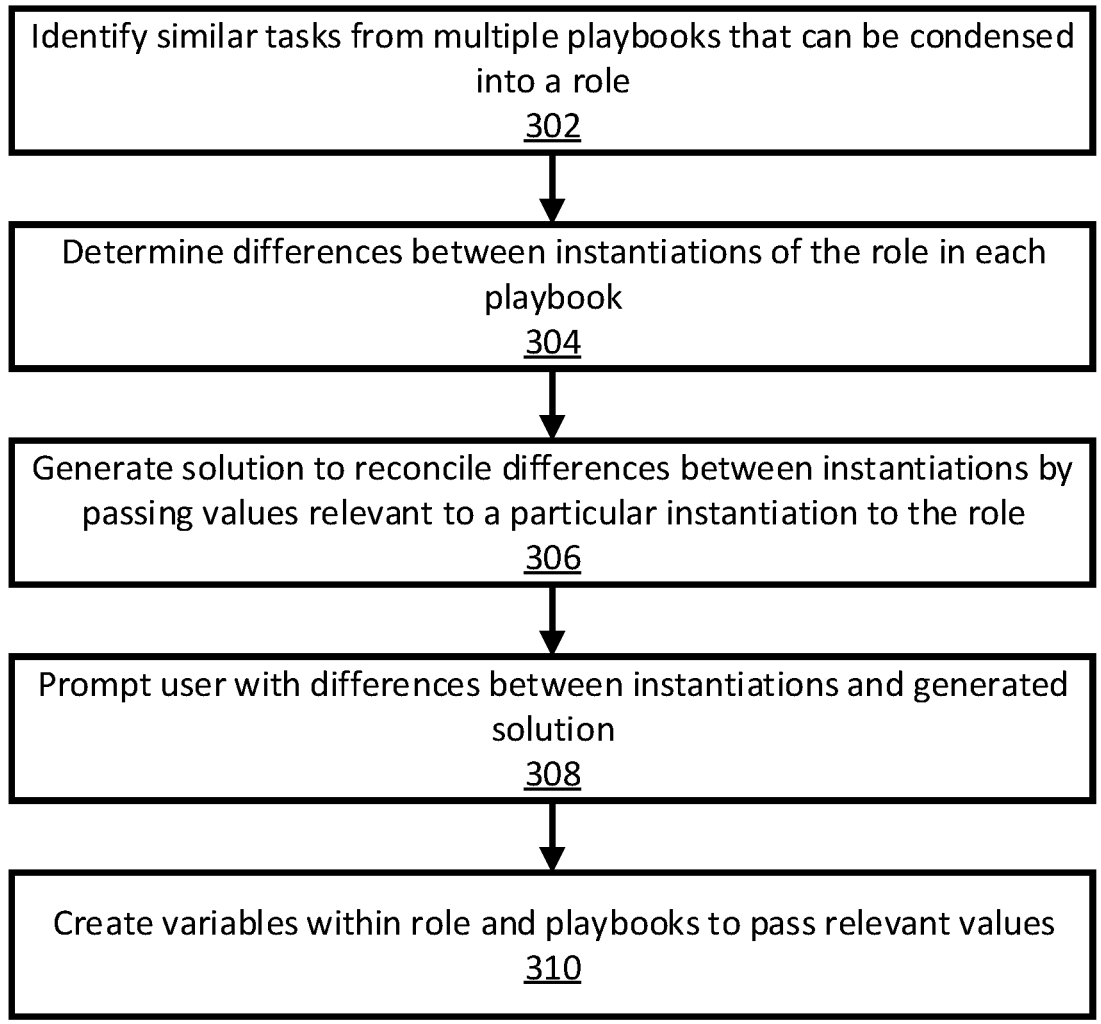
FIG. 3 illustrates a flow chart of an example method for condensing similar, but not identical, tasks within a configuration management project, according to an example embodiment of the present disclosure.

FIG. 3 illustrates a flow chart of an example method 300 for condensing similar, but not identical, tasks within a configuration management project, according to an example embodiment of the present disclosure. It should be appreciated that the example method 300 is presented with a high level of abstraction, and that the blocks of the flow chart depicted in FIG. 3 may consist of a number of activities, some of which may not be described herein.

At block 302, a system identifies similar tasks from multiple playbooks that can be condensed into a role. A similar task is defined as at least two sections of playbooks that share enough similarities that they are interchangeable with minor alterations. For example, a similar task exists where two sections of playbooks can be interchanged by employing an additional variable and a forked section of code.

The system may detect sections of the plurality of sections of playbooks that exceed a predefined threshold of similarity. This threshold can be defined based upon any metric or combination of metrics related to the tasks or project structure. For example, the threshold can be defined as two groupings of tasks possessing a certain percentage of identical text, a certain set of structural patterns, substantially similar functionality, or any combination thereof. It should be appreciated that many other metrics may be included beyond what is disclosed herein, and that examples which employ machine learning especially may employ metrics that are unknown to even the creators of a system. The system may search for parallel structures (see FIG. 2) to identify similar tasks.

At block 304, the system determines the differences between the instantiations of a prospective role within each playbook. The prospective role must replace at least a subgrouping of the plurality of sections identified at block 302, so a determination must be made regarding how the plurality of sections differ from one another in order to implement a role to replace them. Differences determined by the system may include (but are not limited to) minor structural variations between sections, different variable inputs between sections, different variable outputs between sections, and differing numbers of iterations of a loop within a section.

At block 306, the system generates a solution to reconcile the differences between sections that were determined in block 304. The system may implement a forked structure in the prospective role in order to accommodate structural differences between sections. For example, the system may implement an if, else structure at a point where two sections structurally diverge and a control variable to select the particular fork to be executed in a particular instantiation. The system may also implement additional input or output variables to accommodate differing numbers of inputs or outputs between sections. For example, two similar tasks having a difference where a first task has two input variables and a second task has three input variables may both be replaced by a single role, where the role has three input variables. In this scenario, the role always employs two of the input variables, and a third input variable acts as an optional extra input that is excluded from calculations when passed a predetermined value. Alternatively, the third input variable may be included or excluded responsive to a value of a fourth input control variable.

At block 308, the system prompts a user with a summary of the differences determined at block 304 and the solutions generated at block 308. The prompt may include source code, a higher-level abstracted summary of the differences and solutions, information about locations within the project structure of affected sections, and combinations thereof. The prompt may include an interface through which the user can select a preferred solution for final implementation. The interface may include a source code editor that allows the user to alter the solutions and affected sections manually. The interface may also include a mechanism through which the user can choose which sections to which a solution is to be applied, and through which the user can assign different solutions to subgroupings of sections.

At block 310, the system implements the prospective role with the solution or solutions that the user selected responsive to the prompt at block 308 (see FIG. 1). Implementing the role may involve creating variables within playbooks that will use the role in order to pass relevant values into the role. For example, when the role utilizes a forked structure to accommodate multiple versions of a section, the system may create control variables in the playbook that are passed to the role and which select a fork to be executed when the role is referenced by the playbook. A variable may also be created within the playbook that, when passed to the role, determines a number of times that the role will iterate through a loop.

FIG. 4 illustrates a flow chart of an example method 400 for consolidating both similar and identical tasks within a configuration management (CM) project, according to an example embodiment of the present disclosure. It should be appreciated that the example method 400 is presented with a high level of abstraction, and that the blocks of the flow chart depicted in FIG. 4 may consist of a number of activities, some of which may not be described herein.

At block 402, a system receives a request for modification of a CM project. The request may be initiated by a user or by an automatic process. For example, the request may be automatically generated responsive to a change in source code. The request may originate on a machine executing the system, or the request may have an origin external to the machine executing the system.

At block 404, the system analyzes playbooks within the CM project to identify similar and identical tasks within multiple playbooks. The system may look for parallel and duplicate structures in source code (see FIG. 2) in order to identify similar and identical tasks. The process of identifying similar tasks is described in greater detail in the description block 302 of method 300 (see FIG. 3). Identical tasks are defined as two or more tasks that both accept a same number of input variables, both return a same number of output variables (though the number of input variables may not be the same as the number of output variables), and perform the same internal operations. The system may identify similar and identical tasks by inspecting metadata associated with a plurality of tasks. For example, a task may include a written description which the system may parse in order to determine functionality. The task may also include a numerical identifier which the system may use to quickly identify or categorize tasks.

At block 406, the system consolidates identical tasks identified at block 404 into at least one role. Consolidating identical tasks may involve copying source code from an existing task into the role (see description of FIG. 2). The system may rename variables to improve readability when consolidating identical tasks. This step may be omitted when no identical tasks are identified.

At block 408, the system replaces the identical tasks within their respective playbooks with references to the at least one role created at block 406. The system may merely perform this step for a subgrouping of the identical tasks. This step may be omitted when no identical tasks are identified.

At block 410, the system prompts the user with options for consolidating the similar tasks identified at block 404 (see description of block 308 in FIG. 3). The system may omit this step when no similar tasks are identified. The method 400 may omit this step when the similar tasks are configured such that the system can identify just one solution for condensing the similar tasks.

At block 412, the system consolidates the similar tasks into at least one role (see description of block 310 in FIG. 3). This step may be executed in response to user input responsive to the prompt at block 410. The method 400 may omit this step when no similar tasks are identified.

At block 414, the system replaces similar tasks within their respective playbooks with the at least one role created at block 412. The system may merely perform this step for a subgrouping of the similar tasks. This step may be omitted when no similar tasks are identified.

Figure 5:
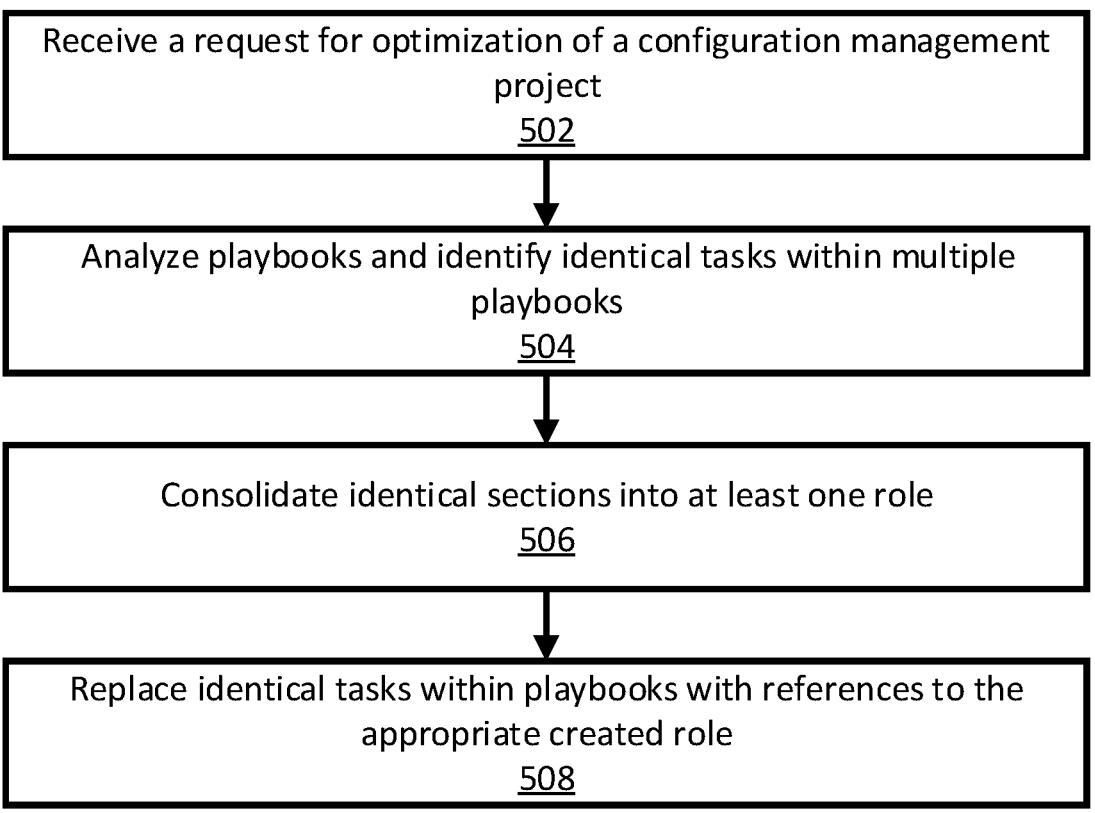
FIG. 5 illustrates a flow chart of an example method for consolidating identical tasks within a configuration management project, according to example embodiments of the present disclosure.

FIG. 5 illustrates a flow chart of an example method 500 for consolidating identical tasks within a configuration management (CM) project, according to example embodiments of the present disclosure. It should be appreciated that the example method 500 is presented with a high level of abstraction, and that the blocks of the flow chart depicted in FIG. 4 may consist of a number of activities, some of which may not be described herein.

At block 502, a system receives a request for modification of a CM project. The request may be initiated by a user or by an automatic process. For example, the request may be automatically generated responsive to a change in source code. The request may originate on a machine executing the method 500, or the request may have an origin external to the machine executing the method 500.

At block 504, the system analyzes playbooks within the CM project to identify identical tasks within multiple playbooks (see description of block 404 of FIG. 4). The system may look for duplicate structures in source code (see FIG. 2) in order to identify identical tasks. Identical tasks are defined as two or more tasks that both accept a same number of input variables, both return a same number of output variables (though the number of input variables may not be the same as the number of output variables), and perform the same internal operations. The system may identify identical tasks by inspecting metadata associated with a plurality of tasks. For example, a task may include a written description which the system may parse in order to determine functionality. The task may also include a numerical identifier which the system may use to quickly identify or categorize tasks.

At block 506, the system consolidates identical tasks identified at block 504 into at least one role (see description of block 406 of FIG. 4). Consolidating identical tasks may involve copying source code from an existing task into the role (see description of FIG. 2). The system may rename variables to improve readability when consolidating identical tasks.

At block 508, the system replaces the identical tasks within their respective playbooks with references to the at least one role created at block 506 (see description of block 408 in FIG. 4). The system may merely perform this step for a subgrouping of the identical tasks.

Figure 6:
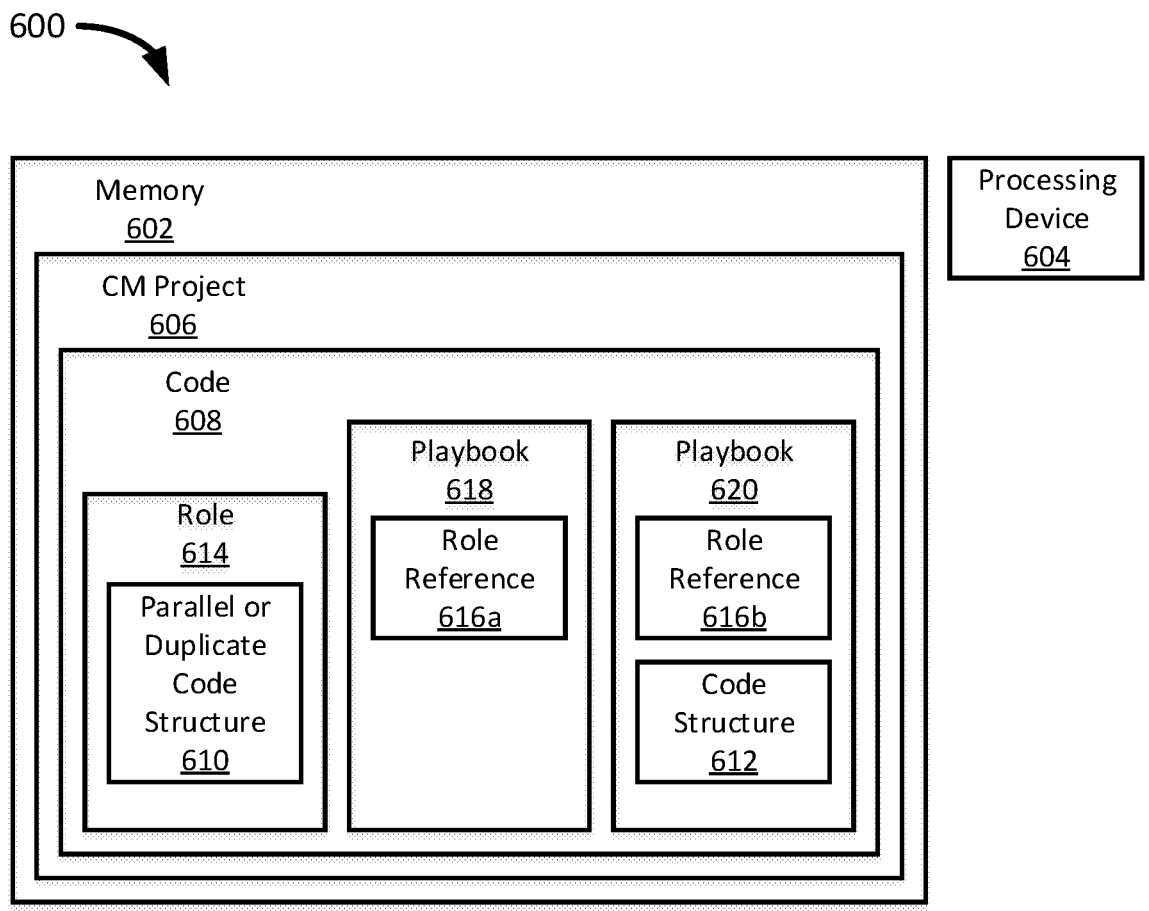
FIG. 6 illustrates a block diagram of an example computing system, according to example embodiments of the present disclosure.

FIG. 6 illustrates a block diagram of an example computing system 600, according to example embodiments of the present disclosure. A system 600 comprises a memory 602 and a processing device 604, operatively coupled to the memory 602, to analyze code 608 from a configuration management (CM) project 606, identify parallel and duplicate structures in the code 606, and modify the code 606 to condense the parallel and duplicate structures into a plurality of roles 614 that can be referenced 616a and 616b (collectively, references 616a-b) by a playbook 618 and a playbook 620 (collectively, references 616a-b). In various examples, the code 608 may contain additional playbooks 618 and 620. In this example, playbook 618 contains a reference 616a to the role 614 while playbook 620 contains a reference 616b to the role 614 and an additional code structure 612. In various examples, the playbooks 618 and 620 may contain additional code structures 612. In various examples, the playbooks 618 and 620 may contain additional references 616a-b to the one or more roles 614. Each of the one or more roles 614 may contain a parallel or duplicate code structure 610 that has been condensed into a role 614 and replaced within the playbooks 618 and 620 by references 616a-b to the role 614. In various examples, merely a subgrouping of the playbooks 618 and 620 contains references 616a-b.

It will be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures. As will be appreciated by one of skill in the art, the functionality of the program modules may be combined or distributed as desired in various aspects of the disclosure.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced otherwise than specifically described without departing from the scope and spirit of the present disclosure. Thus, embodiments of the present disclosure should be considered in all respects as illustrative and not restrictive. It will be evident to the annotator skilled in the art to freely combine several or all of the embodiments discussed here as deemed suitable for a specific application of the disclosure. Accordingly, the scope of the invention should be determined not by the embodiments illustrated, but by the appended claims and their equivalents.

What is claimed is:

1. A method comprising:
   hashing a first structure and a second structure in source code from a configuration management project to generate a first hashed value corresponding to the first structure and a second hashed value corresponding to the second structure, the source code of the configuration management project comprising a playbook executable to perform a sequence of tasks;
   determining, based at least on a comparison of the first hashed value and the second hashed value, that the second structure in the source code exceeds a predefined threshold of similarity with respect to the first structure; and
   generating a role configured to replace at least the first structure and the second structure in the source code; and generating a modified version of the playbook by replacing the first structure and the second structure with a reference to the role.

2. The method of claim 1, further comprising:
executing a ruleset to identify the first structure and the second structure in the source code.

3. The method of claim 1, wherein the role comprises a forked structure in the source code configured to interchangeably execute a first section of the source code corresponding to the first structure and a second section of the source code corresponding to the second structure.

4. The method of claim 1, wherein determining that the second structure in the source code exceeds the predefined threshold of similarity with respect to the first structure further comprises detecting that a set of structural patterns is in common between a first section of the source code corresponding to the first structure and a second section of the source code corresponding to the second structure.

5. The method of claim 1, further comprising:
outputting a user interface configured to receive user input to approve a recommended change to the source code, wherein the recommended change comprises replacing the first structure and the second structure with the reference to the role.

6. The method of claim 5, wherein the outputting comprises presenting a summary of the recommended change.

7. The method of claim 5, wherein the outputting comprises presenting an option to individually manage a modification of a version of the role.

8. The method of claim 1, wherein the role is configured to be called in place of the first structure and in place of the second structure.

9. The method of claim 1, wherein determining that the second structure in the source code exceeds the predefined threshold of similarity with respect to the first structure further comprises detecting that a percentage of text is in common between a first section of the source code corresponding to the first structure and a second section of the source code corresponding to the second structure.

10. The method of claim 1, further comprising:
determining differences between the first structure and the second structure; and
generating the role that iterates through a first version corresponding to the first structure and a second version corresponding to the second structure.

11. The method of claim 1, wherein the first structure is a different version of the second structure, and wherein the method further comprises generating the role configured to alter a variable value between a first iteration corresponding to the first structure and a second iteration corresponding to the second structure.

12. A system, comprising:
a memory; and
a processing device, operatively coupled to the memory, to:
hash a first structure and a second structure in source code from a configuration management project to generate a first hashed value corresponding to the first structure and a second hashed value corresponding to the second structure, the source code of the configuration management project comprising a playbook executable to perform a sequence of tasks;
determine, based at least on a comparison of the first hashed value and the second hashed value, that the second structure in the source code exceeds a predefined threshold of similarity with respect to the first structure;
generate a role configured to replace at least the first structure and the second structure in the source code; and
generate a modified version of the playbook by replacing the first structure and the second structure with a reference to the role.

13. The system of claim 12, wherein the processing device is configured to:
execute a ruleset to identify the first structure and the second structure in the source code.

14. The system of claim 12, wherein determining that the second structure in the source code exceeds the predefined threshold of similarity with respect to the first structure further comprises detecting that a set of structural patterns is in common between a first section of the source code corresponding to the first structure and a second section of the source code corresponding to the second structure.

15. The system of claim 12, wherein the processing device is configured to output a user interface configured to receive user input to approve a recommended change to the source code, wherein the recommended change comprises replacing the first structure and the second structure with the reference to the role.

16. The system of claim 12, wherein the role is configured to be called in place of the first structure and in place of the second structure.

17. A non-transitory computer-readable storage medium storing instructions which, when executed by a processing device, cause the processing device to:
hash a first structure and a second structure in source code from a configuration management project to generate a first hashed value corresponding to the first structure and a second hashed value corresponding to the second structure, the source code of the configuration management project comprising a playbook executable to perform a sequence of tasks;
determine, based at least on a comparison of the first hashed value and the second hashed value, that the second structure in the source code exceeds a predefined threshold of similarity with respect to the first structure;
generate a role configured to replace at least the first structure and the second structure in the source code; and
generate a modified version of the playbook by replacing the first structure and the second structure with a reference to the role.

18. The non-transitory computer-readable storage medium of claim 17, wherein determining that the second structure in the source code exceeds the predefined threshold of similarity with respect to the first structure further comprises detecting that a set of structural patterns in common between a first section of the source code corresponding to the first structure and a second section of the source code corresponding to the second structure.

19. The non-transitory computer-readable storage medium of claim 17, wherein the instructions cause the processing device to output a user interface to receive user input to approve a recommended change to the source code, wherein the recommended change comprises replacing the first structure and the second structure with the reference to the role.

20. The non-transitory computer-readable storage medium of claim 17, wherein the role is configured to be called in place of the first structure and in place of the second structure.

* * * * *